United States Patent
Salt et al.

(10) Patent No.: US 7,352,715 B2
(45) Date of Patent: Apr. 1, 2008

(54) TIME SYNCHRONIZATION USING DYNAMIC THRESHOLDS

(75) Inventors: Metin Salt, Alpharetta, GA (US); Steven J. Ragle, Alpharetta, GA (US); Johan Bengtsson, San Carlos, CA (US); Ellen Paik, Silver Springs, MD (US)

(73) Assignee: Cellnet Innovations, Inc., Alpharetta, GA (US)

( * ) Notice: Subject to any disclaimer, the term of this patent is extended or adjusted under 35 U.S.C. 154(b) by 1167 days.

(21) Appl. No.: 10/280,448

(22) Filed: Oct. 25, 2002

(65) Prior Publication Data

US 2003/0103486 A1 Jun. 5, 2003

Related U.S. Application Data

(60) Provisional application No. 60/337,366, filed on Nov. 30, 2001.

(51) Int. Cl.
  *H04Q 7/00* (2006.01)
  *H04B 7/216* (2006.01)
  *H04J 3/06* (2006.01)
  *H04L 7/00* (2006.01)

(52) U.S. Cl. .................. 370/328; 370/335; 370/350; 370/503; 375/358

(58) Field of Classification Search ............... None
  See application file for complete search history.

(56) References Cited

U.S. PATENT DOCUMENTS

| | | | |
|---|---|---|---|
| 4,882,739 A * | 11/1989 | Potash et al. ............... 375/358 |
| 5,276,659 A | 1/1994 | Kotaki |
| 5,517,505 A * | 5/1996 | Buchholz et al. ........... 370/350 |
| 5,535,217 A | 7/1996 | Cheung et al. |
| 5,689,688 A | 11/1997 | Strong et al. |
| 5,784,421 A | 7/1998 | Dolev et al. ................. 375/354 |
| 6,069,887 A | 5/2000 | Geiger et al. ................ 370/338 |
| 6,157,957 A * | 12/2000 | Berthaud ..................... 709/248 |
| 6,195,018 B1 | 2/2001 | Ragle et al. ........... 340/870.01 |
| 6,347,084 B1 * | 2/2002 | Hulyalkar et al. .......... 370/347 |
| 6,351,821 B1 | 2/2002 | Voth ........................... 713/600 |
| 6,370,161 B1 | 4/2002 | Ehrlich et al. .............. 370/516 |
| 6,373,834 B1 * | 4/2002 | Lundh et al. ................ 370/350 |
| 6,449,290 B1 * | 9/2002 | Willars et al. .............. 370/507 |
| 6,577,872 B1 * | 6/2003 | Lundh et al. ................ 455/502 |
| 6,717,915 B1 * | 4/2004 | Liao et al. .................. 370/252 |
| 6,845,085 B1 * | 1/2005 | Wright et al. ............... 370/324 |
| 7,103,124 B1 * | 9/2006 | Lindskog et al. ........... 375/354 |
| 2001/0022823 A1 | 9/2001 | Renaud |

\* cited by examiner

*Primary Examiner*—Melanie Jagannathan
(74) *Attorney, Agent, or Firm*—Kilpatrick Stockton LLP (57) ABSTRACT

Methods and apparatus for time synchronization using dynamic thresholds. A method for synchronizing network elements includes receiving at a network element a time synchronization message sent from a master clock element. The network element includes an internal clock to be synchronized with a master clock of the master clock element. The method includes calculating a latency of the time synchronization message. The method includes estimating an adjustment that may be made to the internal clock in response to the time synchronization message. The method includes determining whether the latency calculated is less than the adjustment estimated. The method includes adjusting the internal clock when the latency calculated is less than the adjustment estimated.

15 Claims, 7 Drawing Sheets

TIME SYNCHRONIZATION USING DYNAMIC THRESHOLDS

This application claims the priority of U.S. Provisional Application Ser. No. 60/337,366, filed Nov. 30, 2001, and entitled Time Synchronization Scheme for Transmitting Metering Information Over a Wireless Network, the disclosure of which is incorporated here by reference in its entirety.

BACKGROUND

This invention relates to time synchronization over a network.

A network generally includes elements that may need to coordinate their operations. When coordination is required, some of these elements have internal clocks that are synchronized with a master clock. One technique for synchronizing is to periodically send messages from the master clock to the network elements. These messages include a time value that the master clock provides (i.e., a time stamp). An element receiving one of the messages estimates the master clock time by calculating any delay between the time the master clocks stamps the message and when the element processes the message and by adding the calculated delay to the time stamp of the message. The element then can adjust, i.e., synchronize, its internal clock to match the estimated time of the master clock. The mentioned delay is often referred to as latency.

One source of latency is the time it takes for the message to travel from the master clock to the element. One way for an element to calculate this travel time is to send a message on a round trip to the master clock and then measure the time it takes the message to return. The element then splits the round trip time to calculate the time it takes for the message to travel from the master clock to the element.

There are usually thresholds beyond which adjustments to the internal clock of an element being considered may not improve synchronization with the master clock. One such threshold is a margin of error with which a network element can estimate the time of the master clock. The described latency is a significant contributor to this margin of error. Conventional synchronization schemes define a preset set value of latency beyond which the margin of error will be too great to synchronize. An element will thus discard a time synchronization message having latency that is greater than the preset value.

Another threshold is a maximum which a network element can change its internal clock without breaking the network. In this case, the element is able to accurately estimate the time of the master clock but the element's internal clock is so much out of synch with the master clock that adjustment will result in errors in the network. Conventional synchronization schemes also define a preset value for this threshold of maximum adjustment.

SUMMARY

The present invention provides methods and apparatus, including computer program products, for synchronizing a network using dynamic thresholds.

In general, in one aspect, a method for synchronizing network elements includes receiving at a network element a time synchronization message sent from a master clock element. The network element includes an internal clock to be synchronized with a master clock of the master clock element. The method includes calculating a latency of the time synchronization message. The method includes estimating an adjustment that may be made to the internal clock in response to the time synchronization message. The method includes determining whether the latency calculated is less than the adjustment estimated. The method includes adjusting the internal clock when the latency calculated is less than the adjustment estimated.

In general, in another aspect, a computer program product, for synchronizing a first clock of a network with a second clock of the network, includes instructions to cause a processor to calculate a latency between the first clock and the second clock. The product includes instructions to estimate an adjustment of the first clock to synchronize the first clock with the second clock. The product includes instructions to determine whether to adjust the first clock, the determining being based on whether the latency calculated is less than the adjustment estimated. The product is tangibly stored on machine-readable medium, In general, in another aspect, a computer program product, for synchronizing a first clock of a network with a second clock of the network, includes instructions to cause a processor to calculate a latency between the first clock and the second clock. The product includes instructions to estimate an adjustment of the first clock to synchronize the first clock with the second clock. The product includes instructions to calculate an earliest current time as indicated by the second clock and a latest current time as indicated by the second clock, the calculation assuming that the latency is completely imbalanced. The product includes instructions to determine that the latency calculated is less than the adjustment estimated when a current time as indicated by the first clock is in between the earliest and latest current times. The product is tangibly stored on machine-readable medium.

Particular implementations of the invention can provide any combination of the following features. A system in accordance with the invention uses dynamic thresholds to determine whether to adjust an internal clock of a network element being considered for synchronization. The system need not rely on a preset acceptable error margin and can improve synchronization where conventional systems would discard a time synchronization message. The system can accommodate balanced as well as unbalanced latency. Balanced latency occurs when the travel time of each leg of a round trip is the same. Unbalanced latency occurs when the travel for each leg is different. The system can accommodate latency that is variable, such as latency that occurs in networks having elements that communicate by wireless transmission and reception, such as radio frequency ("RF") transmission and reception. The dynamic thresholds can account for variables, such as the described latency, for each instance of synchronization.

The details of one or more implementations are set forth in the accompanying drawings and the description below. Other features and advantages will be apparent from the description and drawings.

DESCRIPTION OF DRAWINGS

Like reference symbols in the various drawings indicate like elements.

DETAILED DESCRIPTION

Time synchronization techniques in accordance with the invention uses the fact that as long as the latency of a time synchronization message ("sync message") received by a network element is less than an estimated amount of correction of an internal clock of the network element, it is an improvement to adjust the internal clock. Adjustment in such cases brings the time of the internal clock closer in synch to the time of another clock, such as a master clock of the network, with which the internal clock is being synchronized. The techniques adopt a methodology in which a calculation of the acceptable margin of error is dynamically related to the estimated correction. The acceptable margin of error is not a preset value.

Figure 1:
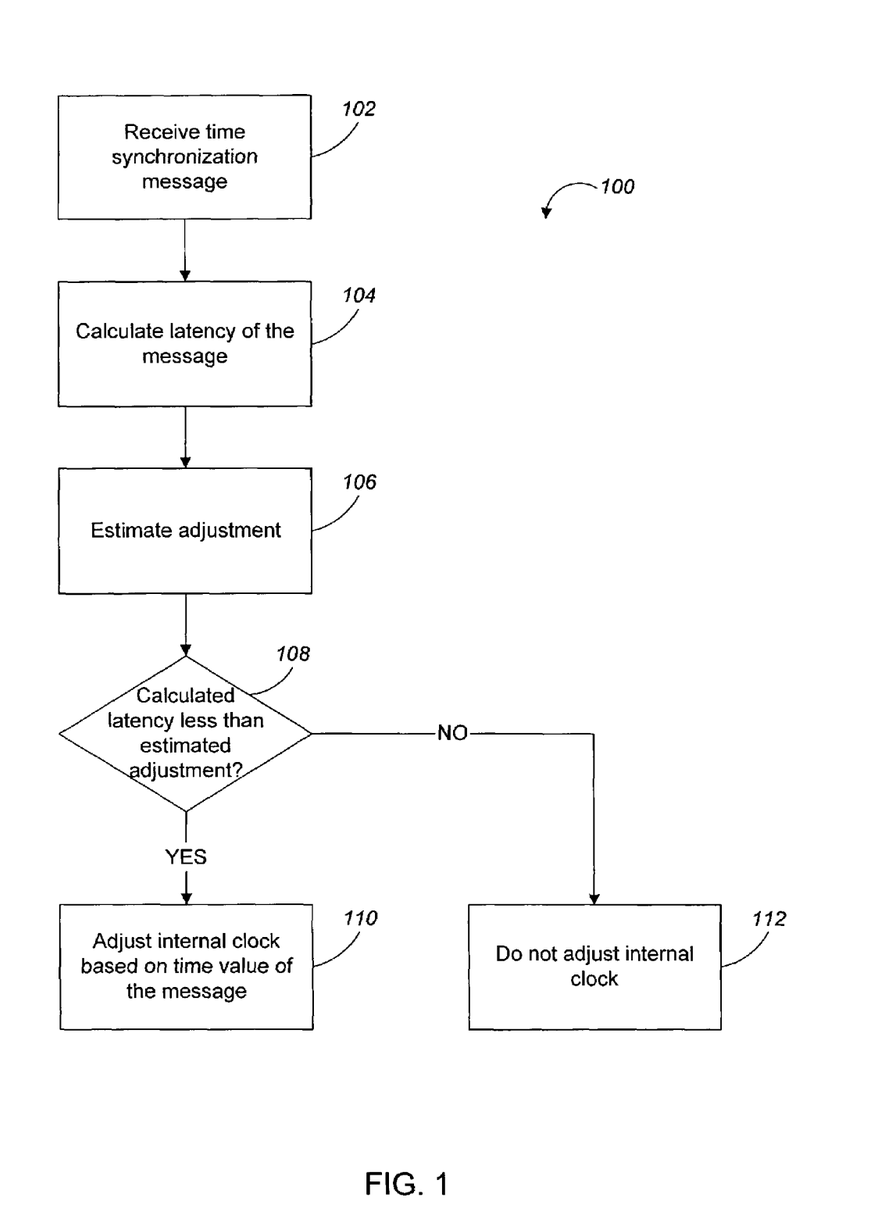
FIG. 1 shows a method for synchronizing one clock of a network with another clock of the network.

FIG. 1 shows a method 100 for synchronizing in accordance with the invention. A network element being synchronized ("sync element") receives a sync message (step 102). The sync element includes an internal clock which is being synchronized with another clock of the network, such as a master clock of the network. The sync message includes a time stamp of, for example, the master clock. The time stamp specifies the time, as indicated by the master clock, when the sync message was sent. The sync message can be sent in response to a request for synchronization ("request") generated by the sync element or, alternatively, in response to a command from a network component such as a controller.

The sync element calculates the latency of the sync message (step 104). The element can calculate the latency by various methods. One method is to calculate a round trip time for a message to travel between the sync element and a source of the sync message. The source is usually a network element that includes the clock, such as the master clock, with which the internal clock of the synch element is being synchronized. Such as clock will be referred to in this specification as the reference clock. If the source is not a network element that does not include a reference clock, then the latency between the source and reference clock should be calculated and considered in the latency calculation described here. In this round-trip time method, the sync element sends its own message, which can be the above mentioned request for synchronization, to the source of the sync message. The sync element marks the times, as indicated by its internal clock, of when the sync element sends the request and of when the source sends the sync message. The difference between these times is the latency involved in requesting and receiving the particular sync message received in step 102. In this case, the system uses the request to both trigger synchronization and to calculate round trip latency.

Alternatively, the sync element can send a message that will be used to only calculate latency and is separate from the request. This type of message will be referred to as a latency calculation message. In this case, the sync element, after it receives the sync message, sends the latency calculation message to the source of the sync message. Upon receiving the latency calculation message, the source returns the message to the sync element. The sync element marks the times, as indicated by its internal clock, of when the sync element sent and received the latency calculation message. When the sync element performs the described method immediately after receiving the sync message, the difference between the described times is a close approximation of the latency of the sync message.

As an alternative to the round-trip time method, other techniques can be used to determine the latency of the sync message. As discussed, the source is usually a network element having the master clock but need not be.

The sync element estimates the adjustment that will be made to its internal clock (step 106). The sync element can estimate the adjustment by various methods. One method is for the sync element to estimate the current time as indicated by the master clock, i.e., the current time of the master clock, by using the time stamp of the sync message. Then, the sync element calculates the difference between the current time as indicated by its internal clock, i.e., the current time of the internal clock, and the estimated current time of the master clock to derive the estimated adjustment. Alternatively, the sync element can use other methods for estimating the adjustment. For example, instead of using the current time to estimate adjustment, the sync element can use a time of any known event, such as when the sync element receives the sync message. Regardless of whether the sync element calculates the difference between the current time of the master clock and the current time of the internal clock or whether the sync element calculates the difference between the time of a known event, the difference in either case indicates the estimated adjustment to synchronize the internal clock with the master clock.

The sync element determines if the calculated latency, which as described can approximately be the round trip time, is less than the estimated adjustment (decision 108). If it is, then the sync element adjusts its internal clock (step 110). In this case, adjustment will very likely result in an improvement of synchronization. That is, the time difference between the master clock and the internal clock of the element will be reduced. If the latency is not less than the estimated adjustment, then the element does not adjust its internal clock (step 112). In this case, an adjustment will likely not result in an improvement of synchronization because the margin of error in the synchronization calculation, as caused by the latency, is greater than the required estimated adjustment.

Although any network requiring synchronization will benefit from the method 100, this method especially benefits those networks having imbalanced latency such as wireless networks. An example of a wireless network is a telemetry system that includes a system controller ("SC"), one or more master controllers ("MCC"), and one or more terminal units. The system controller includes a master clock and each MCC includes an internal clock. The SC and the MCC must synchronize to, e.g., perform operations at the terminal units. This telemetry system is further described in commonly owned U.S. Pat. No. 6,195,018 to Ragle et al., issued on Feb. 27, 2001, and also in commonly owned U.S. patent application Ser. No. 10/128,928, entitled Intelligent Two-way Telemetry, filed on Apr. 22, 2002, which patent and application are hereby incorporated by reference in their entirety.

Figure 2:
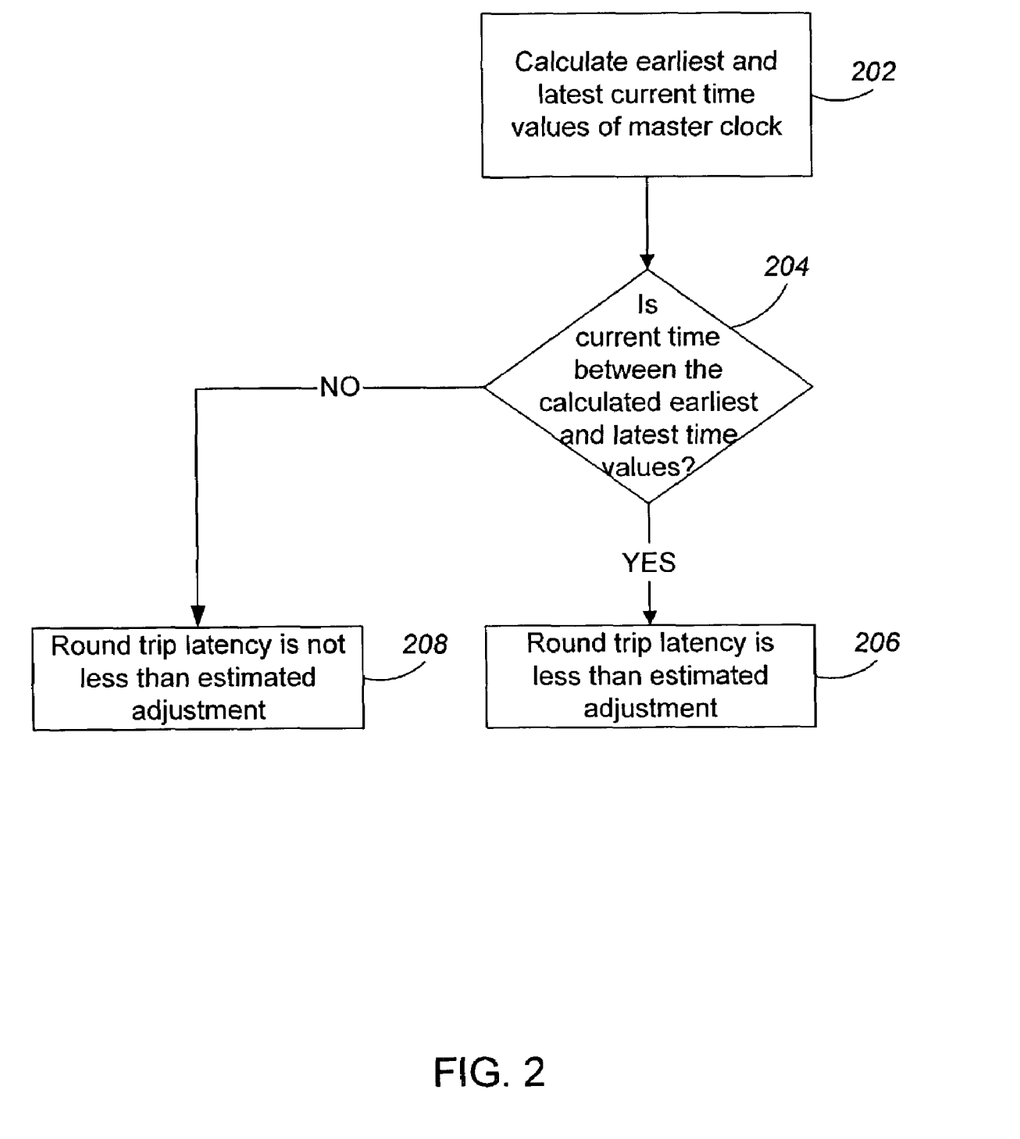
FIG. 2 shows an example of how to determine whether the round trip latency between the clocks being synchronized is less than an estimated adjustment to one of the clocks.

FIG. 2 shows an example of how to determine whether calculated latency, whether balanced or not, is less than the estimated adjustment. In this example, a sync element, such as one of the described MCCs, sends a message requesting synchronization to an element having a master clock ("master clock element"), such as the described SC. In response, the master clock element sends a sync message back to the network element (i.e., the synch element). The sync element receives the sync message. The sync element calculates the round trip time, which includes the time required for the request to travel from the sync element to the source, for the source to process the request and respond, and for the sync message to travel from the source to the sync element. The round-trip time, in this example, represents the latency.

To determine whether calculated latency is less than the estimated adjustment, the synch element calculates the earliest and latest time values of the current time of the master clock, assuming a completely imbalanced latency (step 202). The earliest current time of the master clock results from one extreme case of imbalanced latency where all of the latency is caused by the time it takes for a request message to travel from the sync element to the master clock element. In this extreme case, the earliest current time of the master clock is the time stamp of the synch message. The latest current time of the master clock results from the other extreme case of imbalanced latency where all of the latency is caused by the time it takes for a synch message to travel from the master clock element to the sync element. In this extreme case, the latest current time of the master clock is the time stamp of the synch message plus the calculated latency.

The sync element determines if the current time, as indicated by its internal clock, is between the calculated earliest and latest time values of the current time of the master clock (decision 204). If the current time as indicated by its internal clock is between the calculated earliest and latest time values of the current time of the master clock, then the calculated latency is less than the estimated adjustment (step 206). Otherwise, the calculated latency is not less than the estimated adjustment (step 208).

Optionally, decision 204 can include additional conditions to preclude adjustment when the estimated adjustment is very small such that any adjustment will likely be detrimental to synchronization. This is the case where the internal clock of the synch element is closely synchronized with the master clock. An example of the conditions is that the time of the synch element is not within a certain band of an estimated master clock time.

Figure 3:
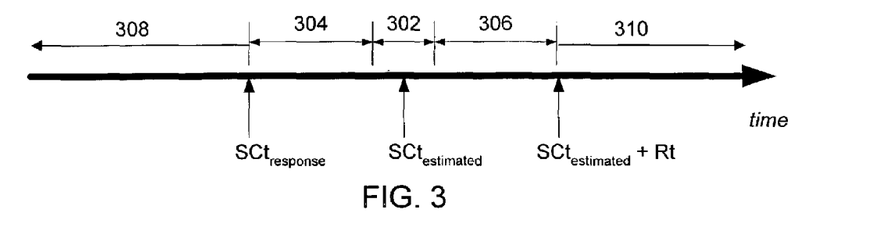
FIG. 3 graphically illustrates the concept of the example of FIG. 2.

FIG. 3 shows a time line that graphically illustrates the concept of the above example. The band of time 302 represents the interval where the internal clock of the synch element is closely synchronized with the master clock and adjustment would likely not result in an improvement of synchronization. The bands of time 304 and 306 represent the interval in which if the current time of the synch element falls, then the round trip latency is less than the estimated adjustment but the internal clock of the synch element is not too closely synchronized with the master clock. When the current time of the synch element falls within this band, adjustment is likely to improve on synchronization. The bands of time 308 and 310 represent time intervals where the round trip latency is greater than estimated adjustment, and adjustment would likely be detrimental to synchronization.

Figure 4:
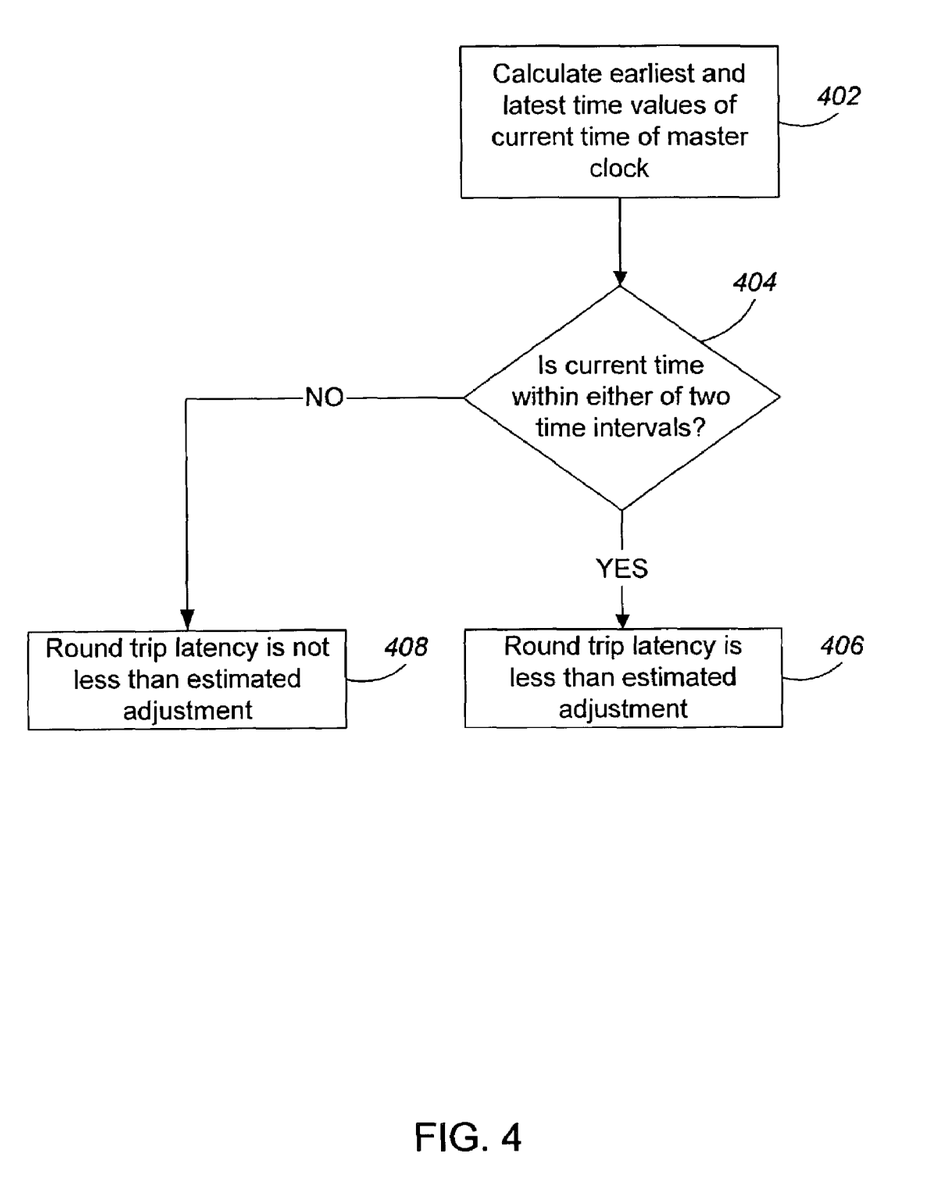
FIG. 4 shows another example of how to determine whether round the trip latency between the clocks being synchronized is less than the estimated adjustment to one of the clocks.

The example described in reference to FIGS. 2 and 3 represents the case where the round trip latency is less than some preset threshold, such as the preset value of latency mentioned in the background section. FIG. 4 shows an example of how to determine whether round trip latency is less than the estimated adjustment when the round trip time is greater than the threshold round trip latency. This is the case where conventional synchronization techniques would discard a sync message.

To determine whether round trip latency is less than the estimated adjustment, the sync element calculates the earliest and latest time values of the current time of the master clock assuming a completely imbalanced latency (step 402). This calculation is similar to the one described for step 202 of FIG. 2.

The sync element determines whether the current time as indicated by its internal clock is within either of two time intervals (decision 404). The first interval lies between the earliest current time of the master clock minus a maximum adjustment band and the earliest current time of the master clock. The second interval lies between the latest current time of the master clock and the latest current time of the master clock plus the maximum adjustment band. The maximum adjustment band delimits adjustment thresholds, beyond which adjustment will very likely cause network errors. That is, adjustment will break the network. If the current time as indicated by the sync element's internal clock lies within these two time intervals, then the round trip value is less than the estimated adjustment and adjustment is likely to improve synchronization (step 406). Otherwise, the round trip value is not less than the estimated adjustment and adjustment is likely to not improve synchronization (step 408). Optionally, the described two time intervals can be expanded to include the interval between them. That is, the two time intervals can be substituted with one time interval delimited by the earliest and the latest times of the two time intervals. With this option, adjustment will still improve synchronization.

Figure 5:
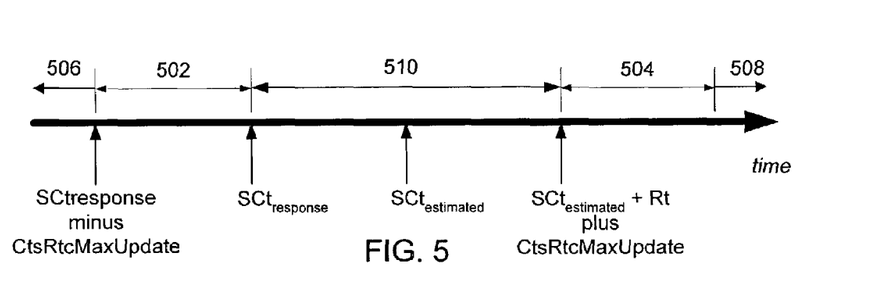
FIG. 5 graphically illustrates the concept of the example of FIG. 4.

FIG. 5 shows a time line that graphically illustrates the concept of the example of FIG. 4. The bands of time 502 and 504 represent the described first and second time interval, respectively. The bands 506 and 508 of time represent the time intervals where synchronization will likely not be improved. The band of time 510 represents the optionally included time interval described above.

Table 1 shows an example of pseudo code for implementing the described methods. The bands of FIGS. 2 through 5 correspond to those defined by the pseudo code. The following definition of terms apply to the pseudo code and to the figures. (The MCC is a synch element and the SC is the master clock element.)

$MSCt_{request}$: The time when MCC sends a request to initiate synchronization as indicated by the internal clock of the MCC.

$MSCt_{response}$: The time when the MCC receives a response to its request as indicated by the internal clock of the MCC.

$SCt_{response}$: The time when the SC sends the response to the MCC as indicated by the master clock.

$SCt_{estimated}$: This is the estimated current time of SC as indicated by calculated by the MCC.

RTC: Current time as indicated by the MCC's internal clock.

Rt: Round Trip Time; the difference between $MSCt_{request}$ and $MSCt_{response}$.

Δt: Time difference between RTC and estimated SC time

CtsMaxRqstMsgRoundtrip: A preset threshold specifying the maximum round trip time above which convention synchronization techniques would discard the sync message.

CtsRtcMaxUpdate: A threshold specifying the maximum which a network element can change its internal clock without breaking the network.

TABLE 1

```
If (RT < CtsMaxRqstMsgRoundtrip)
{
    if(5 > Δt) do_nothing( ); /*band 302*/
    else if(5 < Δt <= CtsRtcMaxUpdate)
    RTC = SCt_estimated; /*bands 304 and 306*/
    else if (CtsRtcMaxUpdate < Δt) declare
    (TIME_SYNC_LARGE_ERROR);
    /*bands 308 and 310*/
}
else if (smaller_of {| SCt_response + Rt − RTC|, |SCt_response − RTC|} <
CtsRtcMaxUpdate)
{
    if (RTC > SCt_response + Rt) RTC = SCt_response + Rt; /*band 504*/
    else if (RTC < SCt_response) RTC = SCt_response; /* band 502*/
    else do_nothing( ); /* bands 506 and 508*/
}
```

The logic of the pseudo code is based on the fact that as long as error margin (i.e., RT/2) is less than the amount of estimated correction (Δt), it is an improvement to adjust the MCC's internal clock (i.e., update the RTC). However, RTC is updated not to $SCt_{estimated}$ but either to $SCt_{response}$ or to ($SCt_{response}$+Rt). This logic reduces the effect of error margin in the updated RTC and avoids larger fluctuations in subsequent updates. Alternatively, RTC can be set to any point between $SCt_{response}$ and ($SCt_{response}$+Rt) and would still be an improvement over the current RTC value. Although it is not guaranteed, any point between RTC current value and $SCt_{estimated}$ can also be an improvement.

Figure 6:
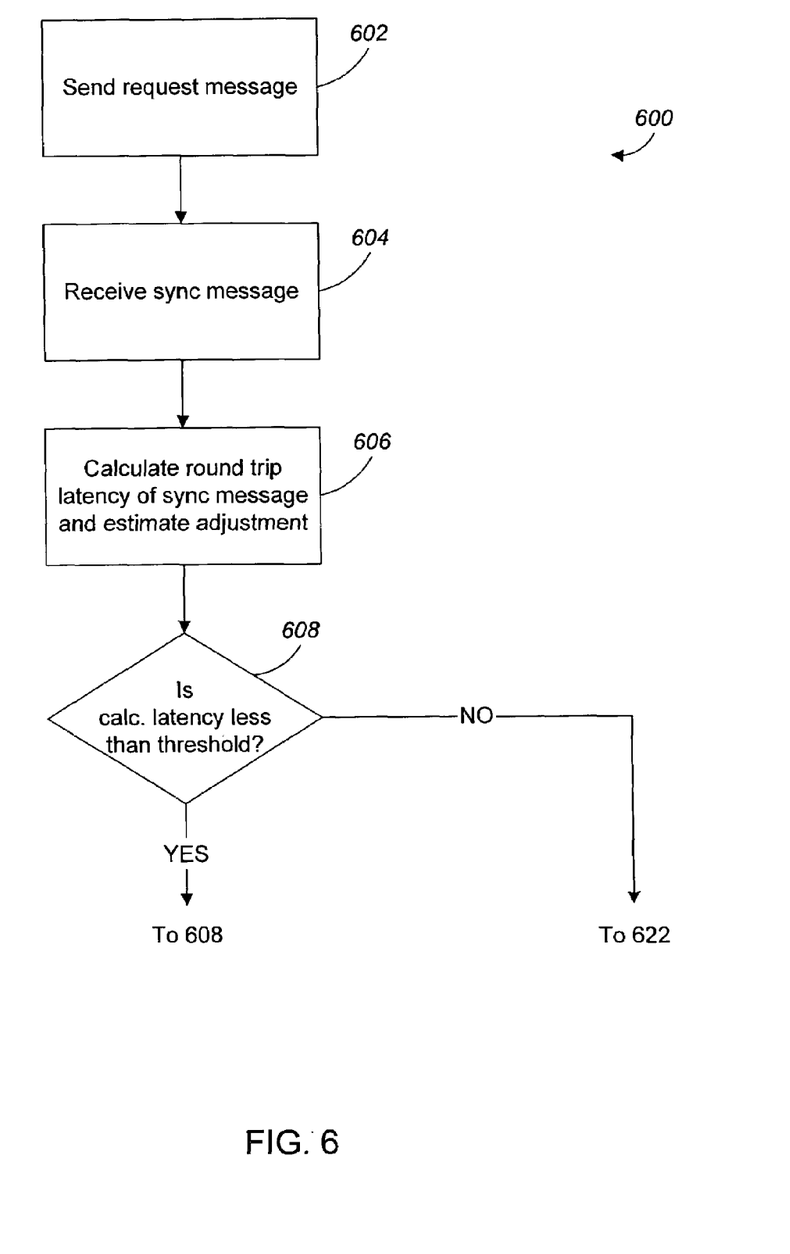
FIG. 6 shows an implementation of the method 100.

FIG. 6 shows method 600, which is one implementation of method 100. An MCC of a wireless network sends a request message to a SC of the network (step 602). The MCC includes an internal clock and the SC includes a master clock. The internal clock of the MCC is being synchronized with the master clock of the SC. In response to the request, the SC sends a synch message, which the MCC receives (step 604). As with the sync messages discussed above, the sync message here includes a time stamp that indicates the time, as indicated by the master clock, when the SC sent the synch message. The MCC estimates the adjustment to the internal clock to synchronize it with the master clock (step 606). The MCC calculates the round trip latency (step 606), which includes the time for the request to travel from the MCC to the SC, the time required by the SC to process and respond to the request, and the time for the sync message to travel from the SC to the MCC. The MCC determines whether the latency is less than a threshold, such as a fixed threshold for latency that is typically used by conventional systems (decision 608).

The process flow diverges at this juncture, depending on the result of decision 608. If the round trip latency is less than the threshold, the MCC calculates the earliest and latest time, as indicated by the master clock, when the MCC received the sync message (step 610). The earliest time is the time indicated by the time stamp. This calculation assumes that the time required for the request to travel from the MCC to the SC is zero and, furthermore, that the time required for the sync message to travel from the SC to the MCC is the calculated latency. The latest time is the time indicated by the time stamp plus the calculated latency. This calculation assumes that the time required for the request to travel from the MCC to the SC is the calculated latency and, furthermore, that the time required for the sync message to travel from the SC to the MCC is zero. The MCC determines if the time, as indicated by the internal clock of the MCC, when the MCC receives the sync message (i.e., $MSCt_{response}$) is between the calculated latest and earliest time (decision 612). If no, then the calculated latency is not less than the estimated adjustment (step 614) and the MCC does not adjust its internal clock (step 616). Otherwise, the MCC determines whether the time, as indicated by the internal clock, when the MCC received the sync message is within five seconds of the time, as indicated by the master clock, of when the SC sent the sync message (decision 620). If the times are within five seconds, then the MCC does not adjust its internal clock (step 616). Otherwise, the MCC adjusts its internal clock.

If the latency is not less than the threshold, the MCC calculates the earliest and latest time, as indicated by the master clock, when the MCC received the sync message (step 624). The calculation is similar to that described in reference to step 610. The MCC determines if the time, as indicated by the internal clock of the MCC, when the MCC receives the sync message (i.e., $MSCt_{response}$) falls within either of two time intervals (decision 626). The time intervals are similar to those described in reference to step 404 of FIG. 4. If no, then the calculated latency is not less than the estimated adjustment (step 628) and the MCC does not adjust its internal clock (step 616). Otherwise, the calculated latency is less than the estimated adjustment (step 630) and the MCC adjusts its internal clock (step 622).

In the above example, the MCC does not estimate adjustment based on the difference between the current times of the MCC and the SC. Rather, the MCC estimates adjustment based on the time when the MCC receives the sync message. With either case, the difference should be the same, or at least very similar, and can be used to adjust the internal clock of the MCC.

The following provides an example scenario. The MCC of the wireless network described above receives a sync message with a time stamp of 988970423 (in seconds) from the SC. The round trip time associated with the sync message is 40 seconds and the maximum predefined latency threshold is 30 seconds. The current time of the MCC's internal clock is 988970603. A conventional system would discard this sync message. Consequently, the MCC would still be 3 minutes off from the master clock of the SC. The systems described herein would however not discard the sync message and, by applying the described techniques, improve synchronization. Assuming a completely imbalanced latency, the SC's current time (as of when the MCC receives the sync message) can be 988970423 or 988970463. Adjustment to either of this time will bring the internal clock closer to the time of the master clock.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made. For example, the steps of the described method can be performed in different order and still achieve the same or similar results. Bands 304 and 306 need not be delimited as described but can also be otherwise delimited and still improve synchronization. For example, the bands 304 and 306 of FIG. 3 and as defined in Table 1 can be increased to and area delimited by ($SCt_{estimated}$−CtsRtcMaxUpdate) and ($SCt_{estimated}$+CtsRtcMaxUpdate). The clock with which the internal clock of the sync element is being synchronized need not be a master clock but can be any clock of the network. The network refers to a set of elements connect by one or more links. The network can include multiple networks. For example, the network can include two enterprise networks linked by the Internet.

What is claimed is:

1. A method for synchronizine network elements, the method comprising:
    receiving at a network element a time synchronization message sent from a master clock element, the network element comprising an internal clock to be synchronized with a master clock of the master clock element, the time synchronization message comprising a time stamp specifying a time, as indicated by the master clock, when the master clock element sent the time synchronization message;
    calculating a latency of the time synchronization message;
    estimating an adjustment to be made to the internal clock in response to the time synchronization message;
    determining whether the latency is less tan the adjustment on the assumption that the latency is imbalanced by
    calculating an earliest current time of the master clock assuming that there is no latency and calculating a latest current time of the master clock by adding the calculated latency to the time stamp;
    adjusting the internal clock when the latency calculated is less than the adjustment estimated.

2. The method of claim 1, wherein determining whether the latency calculated is less than the adjustment estimated comprises:
    determining whether a current time as indicated by the internal clock is between the earliest and latest current time of the master clock.

3. The method of claim 1, wherein:
    calculating the latency comprises calculating latency that varies from one instance of synchronization to another instance of synchronization; and
    estimating the adjustment comprises estimating adjustment that varies from one instance of synchronization to another instance of synchronization.

4. A method for synchronizing network elements, the method comprising:
    receiving at a network element a time synchronization message sent from a master clock element, the network element comprising an internal clock to be synchronized with a master clock of the master clock element;
    calculating a latency of the time synchronization message;
    estimating an adjustment to be made to the internal clock in response to the time synchronization message;
    determining whether the latency calculated exceeds a threshold;
    when the latency calculated does not exceed the threshold, applying a first set of criteria to determine whether the latency calculated is less than the adjustment estimated;
    when the latency calculated exceeds the threshold, applying a second set of criteria to determine whether the latency calculated is less than the adjustment estimated; and
    adjusting the internal clock when the latency calculated is determined to be less than the adjustment estimated.

5. The method of claim 4, wherein applying the first set of criteria comprises:
    determining whether the master clock and the internal clock are sufficiently synchronized; and
    determining whether adjustment to the internal clack will cause an error in the network.

6. The method of claim 5, wherein:
    determining whether the master clock and the internal clock are sufficiently synchronized comprises determining whether a difference between a current time as indicated by the internal clock and the current time as estimated to be indicated by the master clock is less than five seconds; and
    determining whether adjustment to the internal clock will cause an error in the network comprise determining whether there will be an error cause by adjusting the internal clock because a difference between the current time as indicated by the internal clock and the current time as estimated to be indicated by the master clock exceeds a preset threshold.

7. The method of claim 6, wherein the current time as indicated by the internal clock is a time on the internal clock when the network element received the time synchronization message.

8. The method of claim 4, further comprising sending a request message from the network element to the master clock element, the request message causing the master clock element to send the time synchronization message, and wherein calculating the latency comprises:
    recording a time when the network element sent the request message;
    recording a time when the network element received the time synchronization message sent from the master clock element; and
    calculating a difference between the time when the network element sent the request message and the time when the network element received the time synchronization message sent from the master clock element.

9. A computer-readable medium on which is encoded program code for synchronizing a first clock of a network with a second clock of the network, the program code comprising:

program code for calculating a latency between the first clock and the second clock;

program code for estimating an adjustment of the first clock to synchronize the first clock with the second clock;

program code for using the latency to calculate an earliest current time for the second clock and a latest current time for the second clock, the calculation assuming that the latency is completely imbalanced;

program code for determining whether to adjust the first clock based on whether the latency calculated is less than the adjustment estimated for a first clock current time that is in between the earliest current time for the second clock and latest current time for the second clock; and program code for adjusting the first clock.

10. The computer-readable medium on which is encoded program code of claim 9, further comprising program code for determining that the first clock is to be adjusted when:

the first clock and the second clock are not synchronized within five seconds; and the adjustment will not cause an error in the network.

11. The computer-readable medium on which is encoded program code of claim 9, wherein:

the program code for calculating the latency between the first clock and the second clock comprises program code for calculating a time comprising the time interval elapsed while a first message travels from a second network element comprising the second clock to a first network element comprising the first clock.

12. The computer-readable medium on which is encoded program code of claim 9, wherein:

the program code for calculating the latency between the first clock and the second clock comprises program code for calculating a round trip time comprising the time interval elapsed while, a request message travels from the first network element comprising the first clock to the second network element comprising the second clock, the second element processes the request message, generates and sends a response message, and the response message travels from the second network element to the first network element.

13. The computer-readable medium on which is encoded program code of claim 9, wherein:

the network is a wireless network; and the second clock is a master clock.

14. The computer-readable medium on which is encoded program code of claim 13, wherein:

the network is a radio frequency network.

15. A computer-readable medium on which is encoded program code for synchronizing a first clock of a network with a second clock of the network, the program code comprising:

program code for calculating a latency between the first clock and the second clock;

program code for estimating an adjustment of the first clock to synchronize the first clock with the second clock;

program code for calculating an earliest current time as indicated by the second clock and a latest current time as indicated by the second clock, the calculation assuming that the latency is completely imbalanced;

program code for determining that the latency calculated is less than the adjustment estimated when a current time as indicated by the first clock is in between the earliest and latest current times; and program code for adjusting the first clock.

* * * * *